United States Patent [19]

Prier

[11] Patent Number: 4,914,150

[45] Date of Patent: Apr. 3, 1990

[54] PROCESS FOR PREPARING ANTI-STATIC POLYISOCYANATE-BASED POLYMERS VIA INCORPORATING A POLYALKYLENE CARBONATE-SALT MIXTURE

[75] Inventor: Donald G. Prier, Baton Rouge, La.

[73] Assignee: The Dow Chemical Company, Midland, Mich.

[21] Appl. No.: 279,468

[22] Filed: Dec. 2, 1988

[51] Int. Cl.$^4$ .............................................. C08G 18/44
[52] U.S. Cl. .................................. 524/701; 524/746; 524/777; 524/779; 524/787
[58] Field of Search ............... 524/701, 746, 777, 779, 524/787

[56] References Cited

U.S. PATENT DOCUMENTS

| | | | |
|---|---|---|---|
| 4,357,401 | 11/1982 | Andre et al. | 429/192 |
| 4,617,325 | 10/1986 | Knobel et al. | 521/105 |
| 4,618,630 | 10/1986 | Knobel et al. | 521/105 |
| 4,713,399 | 12/1987 | Webb et al. | 521/110 |
| 4,806,571 | 2/1989 | Knobel et al. | 521/107 |

Primary Examiner—Maurice J. Welsh
Assistant Examiner—Rabon Sergent

[57] ABSTRACT

This invention relates to a process for preparing polyisocyanate-based polymers which have the ability to dissipate static electrical charge. The polymers are rendered semi-conductive by having incorporated into them an anti-static additive which comprises an ionizable metal salt dispersed in a polyalkylene carbonate polyol.

17 Claims, No Drawings

PROCESS FOR PREPARING ANTI-STATIC POLYISOCYANATE-BASED POLYMERS VIA INCORPORATING A POLYALKYLENE CARBONATE-SALT MIXTURE

BACKGROUND OF THE INVENTION

This invention relates to a process for preparing polyisocyanate-based polymers, which have an improved ability to dissipate static electrical charge.

The majority of organic polymers are poor conductors of electricity and therefore have a tendency to accumulate static electrical charge. As such they cannot be readily used in application areas which require semiconductive properties unless further modified.

Polyisocyanate-based polymers are useful in a wide variety of applications. Some of these applications are more sensitive than others to damage or discomfort caused by the accumulation of static electrical charges and their ultimate discharge. Areas where this may be critical include for example packaging of electronic components and medical applications where certain clean room operations require an essentially dust-free environment. Clothing and equipment prepared from or containing polyisocyanate-based polymers may be susceptible to the accumulation of static electricity and therefore will attract or be a means of transporting dust into the clean room or dust-free areas.

It is known for example to incorporate conductive fillers such as fibers, powders and particles into a polymer to enhance its conductivity and thus reduce its potential to accumulate static electricity. However, loadings of such fillers are often in excess of 15 percent or more to obtain the good electrical semi-conductivity. Such high loadings are not beneficial to the polymer and its physical properties and may, for example, increase its brittleness.

In U.S. Pat. Nos. 4,617,325 and 4,618,630 a means of obtaining polyurethane polymers which can dissipate electrical charge is taught by the use of anti-static additives consisting of ionizable salt in combination with "enhancers." The anti-static additive is prepared by dispersing an ionizable salt and enhancer into a polyether polyol. The enhancer compound is a certain carboxylic acid ester or salt of a fatty acid. However, in some instances, the enhancer compound acts as a plasticizer for the polyurethane polymer, altering its properties in an undesirable manner.

For the preparation of certain polyisocyanate-based polymers, the use of polyalkylene carbonate polyols can be advantageous. Polyalkylene carbonate polyols are not readily miscible with the polyether polyols and the anti-static additive described in U.S. Pat. Nos. 4,617,325 and 4,618,630. Polyisocyanate-based polymers made with PAC polyols may be modified to dissipate statical electrical charge by the incorporation of conductive fillers.

It would therefore be desirable to provide a process whereby a polyisocyanate-based polymer formed by the reaction of an isocyanate with an active hydrogen-containing composition containing polyalkylene carbonate polyol and having excellent static electrical discharge properties and good physical properties are prepared.

SUMMARY OF THE INVENTION

It has now been discovered that such polyisocyanate-based polymers can be prepared with excellent static electrical discharge properties by a process employing a polyalkylene carbonate-salt mixture as an anti-static agent.

In one aspect, this invention is a process for preparing a polyisocyanate-based polymer by the reaction of a polyisocyanate with an active hydrogen-containing composition characterized in that the said composition comprises a polyalkylene carbonate polyol having dispersed therein a non-volatile ionizable salt, and said reaction being conducted in the substantial absence of a carboxylic acid ester of $C_{6-30}$ carbon atoms, a fatty acid salt and a phosphate ester compound.

In a second aspect, this invention is a polyisocyanate-based polymer prepared by the reaction of a polyisocyanate with an active hydrogen-containing composition characterized in that the said composition comprises a polyalkylene carbonate polyol having dispersed therein a non-volatile ionizable salt, and said reaction being conducted in the substantial absence of a carboxylic acid ester of $C_{6-30}$ carbon atoms, a fatty acid salt and a phosphate ester compound.

In a third aspect, this invention is a poly(alkylene carbonate) polyol having dispersed therein a non-volatile ionizable salt characterized in that the salt is present in from about 0.01 to about 60 percent of total weight of polyol plus salt.

DETAILED DESCRIPTION OF THE INVENTION

As described in the summary of the invention, polyisocyanate-based polymers prepared by the reaction of an organic isocyanate with an active hydrogen-containing composition can be rendered conductive by incorporating into the active hydrogen-containing composition, or by forming an isocyanate prepolymer of an anti-static additive comprising a polyalkylene carbonate polyol containing dispersed therein a non-volatile ionizable salt. The polyalkylene carbonate polyol containing salt dispersed therein used as anti-static additive in the process of this invention comprises as one component, an ionizable salt. For the purpose of this invention, an ionizable salt is defined as a salt containing at least one metal cation which is in ionic association with at least one anion, and the ions in the presence of an electric field can be mobile. The cation can be any metal which forms an ionizable salt with one or more anions, including those metals in Row II, Groups I(a) and II(a); Row III, Groups I(a), II(a) and III(a); Row IV, Groups I(a) to IV(a) and I(b) to VIII(b); Rows V and VI, Groups I(a) to V(a) and I(b) to VIII(b); and the lanthanide series of the Periodic Table of the Elements. Preferably, the metal is an alkali metal, an alkaline earth metal, cobalt, nickel, iron, copper, cadmium, zinc, tin, aluminum or silver. More preferably, the metal is sodium or potassium.

The anion is any which forms an ionizable salt with the metal cation. The anion is advantageously the conjugate base of an inorganic acid, a $C_2$–$C_4$ carboxylic acid or a tetraorganoboride ion. Suitable anions include, for example, the halides, i.e., fluoride, chloride, bromide and iodide; nitrate, thiocyanate, sulfate, hydrogen sulfate, sulfite, hydrogen sulfite, chlorate, carbonate, phosphate, hydrogen phosphate, dihydrogen phosphate, phosphite, hydrogen phosphite, dihydrogen phosphite, perfluoroalkylsulfonates where the alkyl is a methyl or a $C_6$–$C_9$ alkyl moiety, acetate, tetraorganoboride particularly tetraalkyl, and tetraphenylboride and the like. Of these, salts containing the anions tetraorganoborides, thiocyanates, trifluoromethylsulfonates and acetates are preferred on the basis of generally better performance and lower corrosion. Most preferred are the thiocyanate anion, trifluoromethylsulfonate and the tetraphenyl boride anion, which are less reactive with metals, water or other materials which are often present in the polymer or in the formation of the polymer. The most preferred salts are monovalent metal tetraphenylboride salts and sodium triflate (trifluoromethylsulfonate) salts.

The most preferred monovalent metal tetraphenylboride salt used herein is any salt of a monovalent metal and the tetraphenylboride anion. Among the tetraphenylboride salts, the monovalent metal is preferably one in Group I of the Periodic Table of the Elements and is more preferably potassium or sodium. Most preferred are the alkali metal thiocyanate salts and tetraphenylboride salts comprising sodium and potassium.

As stated before, a $C_6$-$C_{30}$ carboxylic acid ester, a fatty acid salt and a phosphate ester are substantially absent from the reaction mixture. However, these materials may be used in very small amounts, i.e. 1 or less part per 100 parts relatively high equivalent weight PAC polyol, as for example surfactants. Most preferably, essentially none of these materials are present.

A further component comprising the polyalkylene carbonate polyol containing therein dispersed salt is the polyalkylene carbonate polyol. The polyalkylene carbonate polyol, hereafter referred to as PAC polyol, may have any functionality, molecular weight or carbon dioxide percentage. Full details relating to PAC polyols are disclosed by publication U.S. No. 4,686,276, which is herein incorporated by reference. Suitable PAC polyols are those containing up to about 30 percent by weight carbon dioxide and preferably from about 5 to 25 percent by weight carbon dioxide. For reasons of solubility of the salt, it is preferred that the PAC polyol contains polyoxyethylene linkages.

The PAC polyol containing the ionizable salt dispersed therein and which is used as an anti-static additive in the formation of the polyisocyanate-based polymer can be prepared by stirring the salt directly into the PAC polyol. To facilitate the dispersion of the salt in the PAC polyol, the mixing can be conducted at elevated temperatures. Temperatures sufficient to reduce polyol viscosities and provide a mobile mixture without being detrimental to the product and inducing for example thermal degradation, can be employed. Advantageously, the ionizable salt can be dispersed in the PAC polyol in the presence of a liquid as described below. The liquid serves to reduce the viscosity of the PAC polyol, thus assisting the mixing and dispersing of the salt into the polyol.

The liquid is one in which (a) the PAC polyol is miscible, (b) is non-detrimental to the polyol and salt or the process of dispersing the salt in the polyol and (c) can readily be removed after the salt has been dispersed in the polyol. Suitable liquids are the low boiling point organic compounds and include, for example, alcohols, ketones and halocarbons. Examples of suitable alcohols include methanol, ethanol, propan-1-ol, propan-2-ol, isomers of butanol and mixtures thereof. Examples of suitable ketones include acetone, methylethyl ketone, cyclopentanone, cyclohexanone and mixtures thereof. Examples of suitable halocarbons include dichloromethane, trichloromethane, tetrachloromethane, 1,1-dichloroethane, 1,2-dichloroethane, trichloroethane and its various isomers, 1,1-dichloroethylene, 1,2-dichloroethylene, trichloroethylene ethylene and mixtures thereof. The preferred low boiling solvents include methanol, dichloromethane and acetone.

The quantity of liquid employed is sufficient to reduce the viscosity of the PAC polyol and allow efficient mixing with the salt. Advantageously, the quantity of liquid is more than about 25, preferably more than about 40 and most preferred from about 50 to 90 weight percent of the total weight of PAC polyol and liquid.

Any quantity of a non-volatile ionizable salt can be dispersed in the PAC polyol-liquid mixture. The upper limit is only restricted by the resulting viscosity of the PAC polyol/salt dispersion after the removal of the liquid. The higher the salt quantity the greater viscosity of the resulting product. The salt content dispersed in the PAC polyol is advantageously not greater than 60 weight percent based on the weight of the PAC polyol, and preferably is from about 0.01 to about 50, and more preferably from about 1 to about 30, and most preferably from about 1 to about 20 weight percent. For convenience, the PAC polyols having the ionizable salt dispersed therein at these concentrations will be referred to as the antistatic additive or "concentrate."

In preparing polyisocyanate-based polymers, by the process of the invention, the "concentrate" (PAC polyol containing the salt dispersed therein) is formulated with other active hydrogen-containing compounds to give the active hydrogen-containing composition which is reacted with the polyisocyanate. Advantageously, the quantity of concentrate present in the polyisocyanate-based polymer is such that the polymer contains from 0.001 to 10.0, preferably 0.001 to 5.0 and most preferably from 0.001 to 0.1 percent by weight of the ionizable salt. This quantity of salt present in the polymer is sufficient to confer electrical semi-conductivity to the polymer and provide for the dissipation of static electrical charge.

Accordingly, to achieve this concentration of ionizable salt in the polymer, sufficient quantity of concentrate needs to be formulated with the active hydrogen-containing composition to be reacted with the organic polyisocyanate. Alternatively, the required quantity of concentrate may be reacted with polyisocyanate to prepare a prepolymer which is then subsequently used in preparing the polyisocyanate-based polymer of the invention. It is preferred to blend the concentrate with the active hydrogen-containing composition because of the convenience of monitoring and controlling only one isocyanate-active hydrogen reaction.

The quantity of concentrate that is blended with the active hydrogen-containing composition will depend on the weight of salt dispersed in the PAC polyol. Advantageously, the quantity of concentrate present in the active hydrogen-containing composition is from about 0.01 to about 25, preferably from about 0.01 to about 10 and most preferably from about 0.01 to about 5.0 weight percent based on total weight of the active hydrogen-containing composition including the concentrate.

For the purposes of this invention, an active hydrogen-containing compound is one containing a hydrogen atom that, because of its position in the molecule, displays significant activity according to the Zerewitinoff test described by Kohler in the Journal of American Chemical Society, Vol. 49, p. 3181 (1927). Illustrative of such active hydrogen-containing groups are —COOH, —OH, —NH$_2$, —NH—, —CONH$_2$, —SH and —CONH—. Typical active hydrogen-containing compounds include polyols, polyamines, polyamides, polymercaptans and polyacids, collectively these may be referred to as polyahls.

Polyahls suitable for use in the process according to this invention and the preparation of the active hydrogen-containing composition are those in which the concentrate is miscible. For the purpose of this invention, miscible is intended to mean components which can be mixed together to give a stable composition without, for example, phase separation.

Exemplary of suitable polyahls include polyalkylene carbonate polyols, polyester polyols, polycaprolactones and polyamides. When the concentrate is formulated with a polyalkylene carbonate polyol, this polyol may be the same as that used in preparing the concentrate.

The molecular weight and functionality of the suitable polyahl will depend on the properties desired in the polyisocyanate-based polymer. For example, the formation of flexible polyurethanes is favored by using polyahls having relatively high equivalent weights (i.e., 250 to 10,000) and relatively low (i.e., 2 to 4) functionalities. More rigid polyurethanes are generally prepared fom low equivalent weight (i.e., 50 to 250 ) polyahls and those having a higher functionality (i.e., 3 to 16).

Organic polyisocyanates which may be employed include aromatic, aliphatic, and cycloaliphatic polyisocyanates and combinations thereof. Representative of these types are diisocyanates such as metaphenyl diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate and isomers, naphthalene-1,5-diisocyanate, 1-methoxyphenyl-2,4-diisocyanate, diphenylmethane-4,4'-diisocyanate, 4,4'-biphenylene diisocyanate; 3,3'-dimethoxy-4,4'-biphenyl diisocyanate, 3,3'-dimethyl-4,4'-diphenyl diisocyanate and 3,3'-dimethyldiphenylpropane-4,4',4'-diisocyanate; triisocyanate such as toluene-2,4,6-triisocyanate and dimethyldiphenyl/methane-2,2',5',5'-tetraisocyanate and the diverse polymethylene polyphenyl polyisocyanates. A crude polyisocyanate may also be used in making the polyisocyanate-based polymers, such as the crude toluene diisocyanate obtained by the phosgenation of a mixture of toluene diamines or the crude diphenylmethane diisocyanate obtained by the phosgenation of crude diphenylmethane diamine. Polyisocyanate prepolymers prepared from any of the above polyisocyanates may also be employed.

The preferred polyisocyanates for use in the practice of the present invention include toluene diisocyanate, methane diphenylisocyanate, polymethylene polyphenylisocyanate and mixtures thereof. When a mixture of polyisocyanates is employed, the mixture will comprise essentially one polyisocyanate in at least 50, preferably at least 60 and most preferred at least 70 percent by weight of the total polyisocyanate mixture.

The isocyanate index (ratio of equivalents of isocyanates to equivalents of active hydrogen-containing groups) is advantageously from about 0.8 to 5.0, preferably from about 0.8 to 3.0, and most preferably from about 0.8 to about 1.3.

Prepolymers or quasi prepolymers of the foregoing polyisocyanates are also useful herein.

The reaction of polyisocyanate and active hydrogen-containing composition to give a polyisocyanate-based polymer may be conducted in the presence of various other additional components. Additional components commonly used in the preparation of polymers include catalysts, surfactants, blowing agents as required, pigments, fillers, flame retardants, stabilizers and the like.

Any suitable urethane catalyst may be used including tertiary amines such as, for example, triethylene diamine, N-methylmorpholine, N-ethylmorpholine, diethylethanolamine, N-cocomorpholine, 1-ethyl-4-dimethylaminoethyl piperazine, 3-methoxy-N-dimethylpropylamine, N,N-dimethyl-N',N'-methylisopropylpropylene diamine, N,N-diethyl-3-diethylaminopropylamine, dimethylbenzylamine and the like. Other suitable catalysts are, for example, tin compounds such as stannous chloride, tin salts of carboxylic acids such as dibutyltin di-2-ethylhexoate, as well as other organometallic compounds such as are disclosed in U.S. Pat. No. 2,846,408. Catalysts for the trimerization of polyisocyanates, such as alkali metal alkoxides, may also optionally by employed herein.

If the polyisocyanate-based polymer to be prepared is required to be a foam, a blowing agent is employed. Such a blowing agent comprises an inert gas, a low boiling organic liquid such as methylene chloride or trichlorofluoromethane, and/or a chemical blowing agent such as water, peroxide or azo compounds which react during the urethane polymerization reaction to generate a gas. Suitable blowing agents are described in U.S. Pat. Nos. 4,125,487 and 3,753,933 incorporated herein by reference. Sufficient quantity of blowing agent is used to provide a cellular polymer, foam, with the desired density. Larger quantities of blowing agents provide for lower density foams. Preferably, a blowing agent is not present in the reaction mixture.

A surfactant may be used in the reaction mixture to stabilize the polymer-forming reaction mixture until it is sufficiently cured to maintain its cellular structure, if so desired. Numerous surfactants have been found satisfactory. Nonionic surfactants are preferred. Of these, the nonionic surface active agents prepared by the sequential addition of propylene oxide and then ethylene oxide to propylene glycol and the solid or liquid organosilicones have been found particularly desirable. In addition, components such as fillers, fibers, internal mold release additives, cell openers, preservatives, pigments and other colorants, anti-oxidants and the like may be employed as is well-known in the art.

The polyisocyanate-based polymers prepared here may be made in either a one-step or two-step process. In the one-step process, the polyisocyanate and active hydrogen-containing composition and any optional components are brought together in one step and mixed to give the polymer-forming reaction mixture. The reaction mixture may be poured, sprayed or injected into or onto suitable containers, molds or designated application areas. U.S. Pat. Nos. 4,218,543 and 4,552,945 illustrate the process of making a polymer by a one-step method and are incorporated herein by reference.

In the two-step process, all or a major portion of the active hydrogen-containing composition is reacted with the polyisocyanate in a preliminary step to form a prepolymer or quasi prepolymer. This prepolymer or quasi prepolymer is then reacted in a second step with the remaining portion of polyisocyanates and optional other additives to give the polyisocyanate-based polymer reaction mixture which can then be directed to the appropriate application.

Suitable process for preparing polyisocyanate-based polymers are disclosed in U.S. Pat. Nos. 2,764,565;

3,755,212; 3,821,130; and U.S. RE 24,514 incorporated herein by reference.

The resulting polyisocyanate-based polymer which is obtained by the process of this invention is substantially more conductive than a like polymer which is prepared in the absence of the ionizable salt.

The polyisocyanate-based polymer prepared by the process of this invention displays good dissipative potential of static electrical charge and finds value in a wide number of applications. The polymers can, for example, be advantageously used in packaging of electronic components, packaging of agricultural and industrial products which are granular or powders, manufacturing of anti-static footwear and clothing, and the making of plastic feed bottles and transfer lines used in hospitals and laboratories, and preparing anti-static surfaces of, for example, walls, floors, desktops, working areas and shipping containers. The polymers may also be used as an adhesive where insulator properties in laminate structures are not desirable.

ILLUSTRATIVE EMBODIMENTS

The following examples are provided to illustrate the invention and not to limit the scope thereof. All parts and percentages are given by weight, unless otherwise indicated.

EXAMPLE 1

A polyalkylene carbonate-salt complex is prepared by dissolving 900 parts of a polyethylene carbonate triol (equivalent weight 343, 20.9 weight percent $CO_2$ content) in 6000 parts methanol and then adding 100 parts of sodium tetraphenylboride. The mixture is stirred about 15 minutes and then the methanol removed by distillation at reduced pressure and at a temperature of 50° C. to 80° C. Final traces of methanol and any residual water are removed from the polyethylene carbonate-salt complex by passing a steady stream of nitrogen through the solution at 110° C. for about 1 hour. This results in a polyalkylene carbonate-sodium tetraphenylboride mixture containing about 10 percent by weight of salt. This mixture, concentrate, is used as anti-static additive in the preparation of polyisocyanate-based polymers.

Polyisocyanate-based coating polymers are prepared according to the formulation given below employing different quantities of the prepared anti-static additive.

The polymer is prepared by mixing all components, except the isocyanate, on a roller until homogenous. The isocyanate is then added to the homogenous mixture which is then shaken vigorously for about 30 seconds. This resulting mixture is then further mixed on a roller until it passes from being opaque to a clear (about 5 minutes) liquid. The clear liquid is then applied to a 3"×5" piece of cardboard using a #56 wire-wound roller or a 15–20 mil doctor blade. The coating is then allowed to cure overnight at room temperature prior to observing its physical properties.

TABLE I

|  | Polymer 1 | Polymer 2 | Polymer 3 | Polymer 4 | Comparative Polymer A* |
|---|---|---|---|---|---|
| PAC polyol [1] | 64.5 | 64.5 | 64.5 | 64.5 | 64.5 |
| Dowanol ® PMA [2] | 2.86 | 2.86 | 2.86 | 2.86 | 2.86 |
| Surfactant [3] | 1.73 | 1.73 | 1.73 | 1.73 | 1.73 |
| Dibutyltin dilaurate | 0.065 | 0.065 | 0.065 | 0.065 | 0.065 |
| Concentrate | 0.2 | 0.5 | 1.0 | 5.0 | 0 |
| Percent ionizable salt in polymer | 0.015 | 0.037 | 0.073 | 0.37 | 0 |
| Isocyanate Index [4] | 67.1 | 67.1 | 67.1 | 67.1 | 67.1 |
| Surface Resistivity $\log_{10}$ (ohms/sq) | 13.34 | 13.14 | 12.43 | 12.32 | 13.88 |
| Hardness | 8H | 8H | 8H | 8H | 2H |

*Not an example of this invention
[1] Polyoxyethylene carbonate triol, (equivalent weight 343, $CO_2$ weight percent 20.9)
[2] Propylene glycol methyl ether acetate sold by The Dow Chemical Company
[3] Silicone surfactant L-5310 sold by Union Carbide, used as a 2 percent weight solution in Dowanol ® PM acetate
[4] Desmodur N-75, 75% solution produced by Bayer Surface resistivity is measured according to procedure ASTM D-257 using a Doctor Theidig MILLI TO-2 ohmmeter with guard ring electrode assembly. Lower values indicate better conductivity. Hardness (shore) is measured according to procedure ASTM D-2632.

As can be seen from the experimental data, the incorporation of very small amounts of the ionizable salt provide dramatic decreases in the surface resistivity and therefore enhance conductivity of the polymer. As can be seen from the experimental data associated with Polymer 4, it can be noted that substantially increasing the amount of concentrate does not greatly improve the electrical properties over and above the small quantities.

EXAMPLE 2

A polyisocyanate-based adhesive is prepared according to the formulation given below:

| PAC polyol | 12.18 parts |
|---|---|
| Antistatic Additive | (as in Example 1) |
| 1,4-butanediol | 1.10 |
| glass 150–200 micron beads | 0.02 parts |
| (Rubicon) LF-168 MDI* | 9.53 |

*Polymeric MDI sold by Rubicon

The adhesive is smeared onto a 1×4×0.064 inch cold rolled steel plate. A second similar metal plate is pressed over the smeared adhesive to give a 0.5" overlap and the so formed laminate clamped together. The laminate is cured for about 1 hour at about 125° C. and a further 24 hours at ambient temperature.

The laminate has a joint lap shear of 4000 psi (ASTM Method D-1002).

When the cured adhesive was poured into a ⅛ inch thick mold and cured as above, an elastomeric casting is produced that has a surface resistivity ($\log_{10}$) of 11.00 ohm/square.

COMPARATIVE EXAMPLE B

A polymer adhesive is prepared as for Example 2, only in this case the antistatic additive contains no sodium tetraphenylboride.

A laminate as in Example 2 is prepared with which exhibits a lap shear strength of 4097 psi. A casting similarly prepared exhibits a surface resistivity ($\log_{10}$) of 13.2 ohm/square.

This illustrates the improved antistatic properties to be gained by preparing polymer by the process of this invention. Lap shear strength is approximately the same indicating little or no detrimental effect through incorporating the ionizable salt.

EXAMPLE 3

Following the procedure of Example 1, a polyalkylene carbonate polyol-sodium tetraphenylboride complex is prepared by adding to 900 parts of a polyoxyethylene carbonate diol (equivalent weight 1800, 20.4 weight percent $CO_2$) dissolved in 6000 parts acetone, 100 parts of sodium tetraphenylboride. The resulting solvent-free concentrate contains about 10 percent by weight salt.

A flexible polyisocyanate-based foam is prepared according to the following formulation reacted with toluenediisocyanate (Index 1.05).

| | |
|---|---|
| 99.1 parts | polyoxyethylene carbonate triol (eq wt 1053, $1O_2$ 15%) |
| 0.9 parts | concentrate |
| 3.5 parts | water |
| 0.75 | L-532 silicone-surfactant sold by Union Carbide |
| 0.05 | Dabco 33LV hexamethylenediamine catalyst sold by Air Products |
| 0.12 | Stannous octoate |

The resulting foam has a surface resistivity ($\log_{10}$) of 12.50 ohm/square.

COMPARATIVE EXAMPLE C

A similar flexible polyisocyanate-based foam as in Example 3 is prepared only in this case the 0.9 part concentrate is only the polyoxyalkylene carbonate polyol, no sodium tetraphenylboride is present.

The resulting foam has a surface resistivity ($\log_{10}$) of 12.90 ohm/square, thus illustrating that semi-conductive properties of a flexible polyurethane foam can be improved by at least a factor of 2.5 when prepared by the process of this invention.

What is claimed is:

1. A process for preparing a polyisocyanate-based polymer by the reaction of a polyisocyanate with an active hydrogen-containing composition characterized in that the said composition comprises a polyalkylene carbonate polyol having dispersed therein a non-volatile ionizable salt, and said reaction being conducted in the substantial absence of a carboxylic acid ester of $C_{6-30}$ carbon atoms, a fatty acid salt and a phosphate ester compound.

2. The process of claim 1 wherein the non-volatile ionizable salt comprises an alkali metal.

3. The process of claim 2 wherein the non-volatile ionizable salt contains one or more anions selected from the group consisting of fluoride, chloride, bromide, iodide, sulfate, nitrate, chlorate, acetate, thiocyanate, tetraalkylboride, tetraphenylboride and perfluoroalkylsulfonate.

4. The process of claim 3 wherein the non-volatile ionizable salt is an alkali metal tetraphenylboride.

5. The process of claim 3 wherein the non-volatile ionizable salt is an alkali metal thiocyanate.

6. The process of claim 1 wherein the polyalkylene carbonate contains from about 0.01 to about 60 weight percent of the non-volatile ionizable salt dispersed therein.

7. The process of claim 6 wherein the polyalkylene carbonate and non-volatile ionizable salt are mixed together optionally in the presence of a low boiling liquid which can subsequently be removed.

8. The process of claim 7 wherein the low boiling liquid is an alcohol, ketone or halocarbon.

9. The process of claim 1 wherein the active hydrogen-containing composition contains from about 0.01 to about 25.0 weight percent of the polyalkylene carbonate-salt mixture.

10. The process of claim 1 wherein the polyisocyanate is used in such a quantity so as to provide from 0.9 to 1.3 isocyanate groups per active hydrogen of the composition.

11. The process of claim 10 wherein the polyisocyanate essentially is toluene diisocyanate.

12. The process of claim 10 wherein the polyisocyanate essentially is methane diphenylisocyanate.

13. The process of claim 10 wherein the polyisocyanate essentially is polymethylene polyphenylisocyanate.

14. The process of claim 10 wherein the polyisocyanate essentially is an isocyanate terminated prepolymer.

15. A polyisocyanate-based polymer prepared by the reaction of a polyisocyanate with an active hydrogen-containing composition characterized in that the said composition comprises a polyalkylene carbonate polyol having dispersed therein a non-volatile ionizable salt, and said reaction being conducted in the substantial absence of a carboxylic acid ester of $C_{6-30}$ carbon atoms, a fatty acid salt and a phosphate ester compound.

16. The polymer of claim 15 wherein the non-volatile ionizable salt is present in about 0.001 to 10 weight percent of the polymer.

17. A polyalkylene carbonate polyol having dispersed therein a non-volatile ionizable salt characterized in that the salt is present in from about 0.01 to 60 percent of total weight of polyol plus salt.

* * * * *